US009726531B2

(12) United States Patent
Hagari

(10) Patent No.: US 9,726,531 B2
(45) Date of Patent: Aug. 8, 2017

(54) ESTIMATION APPARATUS AND METHOD FOR CYLINDER INTAKE AIR AMOUNT OF INTERNAL COMBUSTION ENGINE

(71) Applicant: Mitsubishi Electric Corporation, Chiyoda-ku, Tokyo (JP)

(72) Inventor: Hideki Hagari, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 539 days.

(21) Appl. No.: 14/506,155

(22) Filed: Oct. 3, 2014

(65) Prior Publication Data

US 2015/0300916 A1 Oct. 22, 2015

(30) Foreign Application Priority Data

Apr. 16, 2014 (JP) .................... 2014-084679

(51) Int. Cl.
| | |
|---|---|
| *G01F 1/00* | (2006.01) |
| *G01F 3/00* | (2006.01) |
| *F02D 41/18* | (2006.01) |
| *F02D 41/00* | (2006.01) |
| *G06F 11/30* | (2006.01) |
| *G01F 1/72* | (2006.01) |

(52) U.S. Cl.
CPC ............ *G01F 3/00* (2013.01); *F02D 41/0007* (2013.01); *F02D 41/18* (2013.01); *F02D 2200/0402* (2013.01); *F02D 2200/0406* (2013.01); *F02D 2200/0411* (2013.01); *F02D 2200/0414* (2013.01); *G01F 1/72* (2013.01)

(58) Field of Classification Search
CPC ........................................ G01F 3/00
See application file for complete search history.

(56) References Cited

U.S. PATENT DOCUMENTS

2013/0282256 A1* 10/2013 Watanuki ............... F02D 23/02
701/102

FOREIGN PATENT DOCUMENTS

| JP | 2013-224596 | * 10/2013 |
|---|---|---|
| JP | 2013-224596 A | 10/2013 |
| JP | 5328967 B1 | 10/2013 |

* cited by examiner

*Primary Examiner* — Phuong Huynh
(74) *Attorney, Agent, or Firm* — Sughrue Mion, PLLC; Richard C. Turner

(57) ABSTRACT

Provided is a cylinder intake air amount estimation apparatus for an internal combustion engine, which is capable of highly precisely calculating a cylinder intake air amount based on an AFS intake air amount in a control system for an engine including a supercharger. A cylinder intake air amount calculation part calculates the cylinder intake air amount based on an intake opening intake air amount by using a physical model of an intake system derived based on a volume efficiency acquired by considering an intake manifold as a reference, which is a volume efficiency of air entering a cylinder from the intake manifold, a virtual intake manifold volume, and a stroke volume per cylinder, the physical model being adapted to the control system for an engine including a supercharger.

6 Claims, 8 Drawing Sheets

ESTIMATION APPARATUS AND METHOD FOR CYLINDER INTAKE AIR AMOUNT OF INTERNAL COMBUSTION ENGINE

BACKGROUND OF THE INVENTION

1. Field of the Invention

The present invention relates to an estimation apparatus and method for a cylinder intake air amount of an internal combustion engine including a supercharger.

2. Description of the Related Art

A control system for an engine including a supercharger has been known in the related art in order to increase an output of an internal combustion engine (hereinafter also referred to as "engine"). As an example of the supercharger, there is known a turbocharger (hereinafter also referred to as "T/C") in which a compressor driven by rotating a turbine at a high speed by an energy provided by an exhaust gas is installed in an intake system of the engine.

Moreover, as another example of the supercharger, there is known a mechanical supercharger (hereinafter also referred to as "S/C") in which a compressor driven by a crankshaft via a belt or the like is installed in the intake system of the engine. Moreover, in recent years, there are known a supercharger in which a plurality of T/Cs are connected in parallel or serial, a supercharger including both a T/C and an S/C, and an electric charger in which a compressor is directly driven by a motor.

Moreover, as a method of acquiring an intake air amount in the engine control system, there are known a method (hereinafter referred to as "AFS method") of detecting the intake air amount by using an airflow sensor (hereinafter referred to as "AFS") and a so-called speed density method (hereinafter referred to as "S/D method") of estimating the intake air amount based on a pressure in an intake manifold. It should be noted that both the AFS method and the S/D method are used in the control system for an engine including a supercharger.

On this occasion, the method of estimating the intake air amount by the S/D method estimates an intake air amount (hereinafter referred to as "cylinder intake air amount") actually entering the cylinder from the intake manifold pressure based on a correlation between the intake manifold pressure and the intake air amount adapted in advance, and the cylinder intake air amount can be estimated by approximately the same method both in the engine control system for an engine including a supercharger and in the engine control system for an engine without a supercharger (hereinafter referred to as "N/A system").

Moreover, this method directly reflects a change in intake manifold pressure to an estimated value of the cylinder intake air amount, resulting in an excellent response characteristic during a transient operation. On the other hand, this method has such a problem that an estimation error in the cylinder intake air amount during operations including a steady state operation is relatively large due to an error caused by a machine difference from an engine used for the adaptation and an error caused by a difference in environment from that during the adaptation.

In contrast, the method of detecting the intake air amount by the AFS method directly measures the airflow rate (hereinafter referred to as "AFS intake air amount") passing through an AFS installed part (hereinafter referred to as "AFS part"). Moreover, the cylinder intake air amount during the steady state operation is approximately the same as the AFS intake air amount, and it is considered that a calculation error of the cylinder intake air amount during the steady state operation is relatively small.

On this occasion, a distance from the AFS part to the cylinder is long, and the cylinder intake air amount needs to be calculated by simulating a response lag due to the distance. It is thus considered that a calculation precision of the cylinder intake air amount during a transient operation depends on a precision of a physical model of the intake system simulating the response lag. Thus, physical models (for example, refer to Japanese Patent No. 5328967) modeling a response lag in the intake system for causing the air that has passed through the throttle valve to enter the cylinder have been proposed.

However, the related art has the following problem.

The physical model of the intake system for the N/A system is detailed in Japanese Patent No. 5328967, but no reference is made about a control system for an engine including a supercharger.

Even if the physical model described in Japanese Patent No. 5328967 is directly applied to the control system for an engine including a turbocharger, only the response lag in a throttle downstream portion can be simulated. The model does not consider a throttle upstream portion extending from the AFS part to the compressor, and thus there is a problem in that a large error is generated in a response characteristic during the transient operation.

SUMMARY OF THE INVENTION

The present invention has been made in view of the above-mentioned problem, and therefore has an object to provide an estimation apparatus and method for a cylinder intake air amount of an internal combustion engine capable of highly precisely calculating a cylinder intake air amount from an AFS intake air amount by means of a physical model of an intake system simulating the response lag from an AFS part to a cylinder in a control system for an engine including a supercharger, which is configured to calculate the cylinder intake air amount by means of an AFS method.

According to one embodiment of the present invention, there is provided a cylinder intake air amount estimation apparatus for an internal combustion engine in which a path from an intake opening of an intake pipe of the internal combustion engine to a cylinder of the internal combustion engine is partitioned into a plurality of areas different in a density of air from one another, the cylinder intake air amount estimation apparatus being configured to calculate, based on an intake opening intake air amount taken into the internal combustion engine from the intake opening, a cylinder intake air amount entering the cylinder, the cylinder intake air amount estimation apparatus including: an intake air amount detection part provided close to the intake opening so as to detect the intake opening intake air amount; a per-area density calculation part for calculating the density of each of the plurality of areas; an all-area average density calculation part for calculating, based on an intake pipe volume and the calculated density in each of the plurality of areas, a mass of the air existing in all of the plurality of areas and an average density of all of the plurality of areas; a virtual intake manifold volume calculation part for calculating, based on the mass of the air existing in all of the plurality of areas and a total volume of the intake pipe, a virtual intake manifold volume by assuming that the density of the air in all of the plurality of areas is equal to a density in an intake manifold closest to the cylinder; and a cylinder intake air amount calculation part for calculating the cylinder intake air amount based on the intake opening intake air amount by using a physical model of an intake system derived based on a volume efficiency acquired by considering the intake manifold as a reference, which is a volume efficiency of the air entering the cylinder from the intake manifold, the virtual intake manifold volume, and a stroke volume per cylinder, the physical model being adapted to a control system for an engine including a supercharger.

In the cylinder intake air amount estimation apparatus for an internal combustion engine according to one embodiment of the present invention, the cylinder intake air amount calculation part calculates the cylinder intake air amount based on the intake opening intake air amount by using the physical model of the intake system adapted to the control system for an engine including a supercharger, which is derived based on the volume efficiency acquired by considering the intake manifold as the reference, which is the volume efficiency of the air entering the cylinder from the intake manifold, the virtual intake manifold volume, and the stroke volume per cylinder.

Therefore, the cylinder intake air amount can be highly precisely calculated from the AFS intake air amount by means of the physical model of the intake system simulating the response lag from the AFS part to the cylinder in the control system for an engine including a supercharger, which is configured to calculate the cylinder intake air amount by means of the AFS method.

DETAILED DESCRIPTION OF THE PREFERRED EMBODIMENTS

Figure 1:
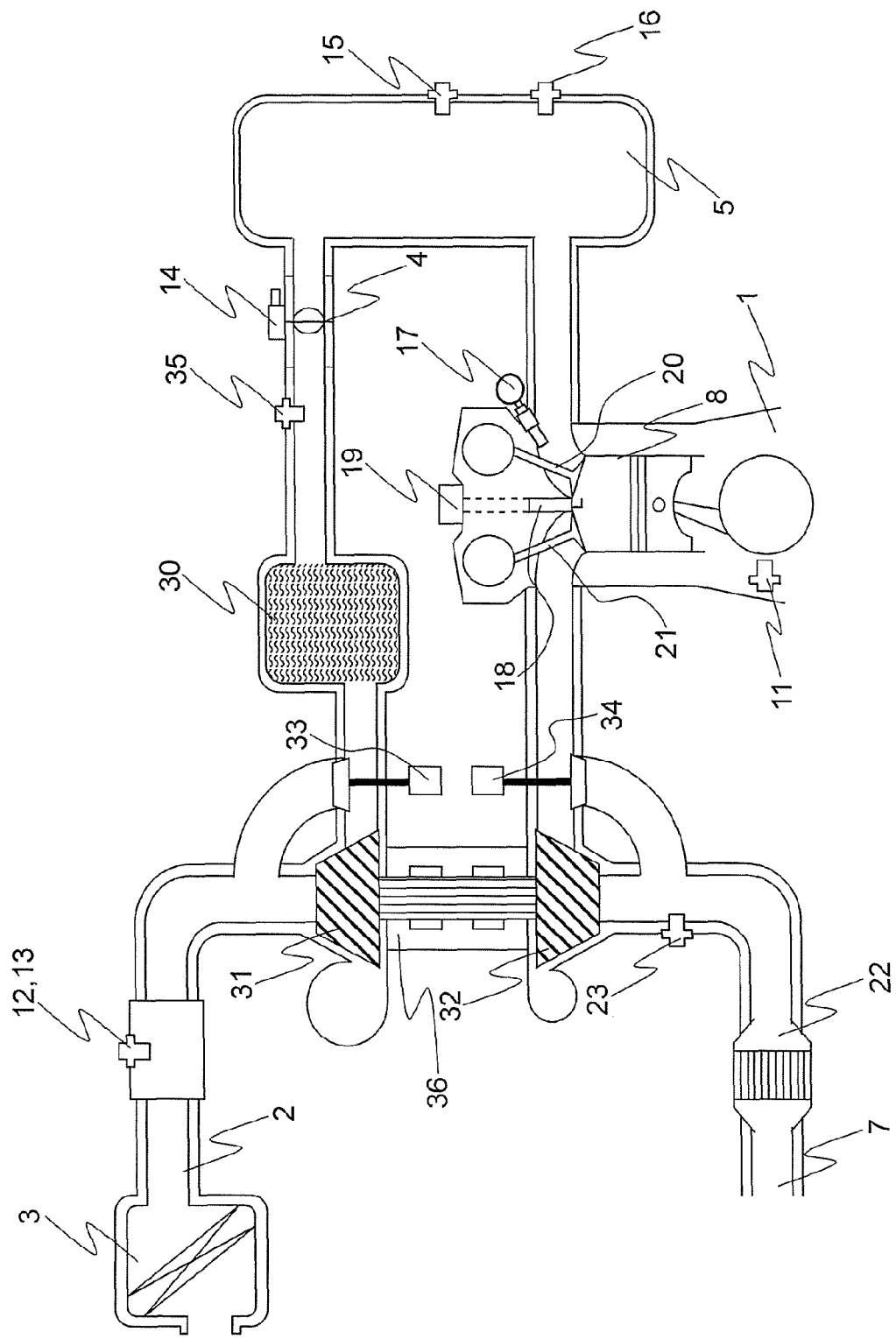
FIG. 1 is a configuration diagram illustrating an control system for an engine including a turbocharger to which a cylinder intake air amount estimation apparatus for an internal combustion engine according to a first embodiment of the present invention is applied.

A description is now given of an estimation apparatus and method for a cylinder intake air amount of an internal combustion engine according to preferred embodiments of the present invention referring to the accompanying drawings, and throughout the drawings, like or corresponding components are denoted by like reference numerals to describe those components. The estimation apparatus and method for a cylinder intake air of an internal combustion engine according to the present invention highly precisely estimate an intake air amount entering into a cylinder after passing through a compressor, an intercooler, a throttle, and the like from an intake air amount detected in an upstream portion of an intake system by means of simple calculation.

First Embodiment

FIG. 1 is a configuration diagram illustrating a control system for an engine including a turbocharger to which a cylinder intake air amount estimation apparatus for an internal combustion engine according to a first embodiment of the present invention is applied. In FIG. 1, a crank angle sensor 11 for generating an electric signal corresponding to a rotational angle of a crankshaft of an engine 1 is provided for the crankshaft. Moreover, an intake pipe 2 for forming an intake passage and an exhaust pipe 7 for forming an exhaust passage are each connected to a cylinder 8 of the engine 1.

An air cleaner 3 for cleaning taken outside air is installed on the most upstream portion of the intake pipe 2. An intake air amount detection part (AFS) 12 for generating an electric signal corresponding to an intake air amount and an intake air temperature sensor 13 for generating an electric signal corresponding to an intake air temperature in the intake passage are integrally or individually provided on a downstream side of the air cleaner 3. It should be noted that in FIG. 1, an example where both the sensors 12 and 13 are integrally constructed is illustrated.

An exhaust gas purification catalyst 22 for purifying an exhaust gas is installed on the most downstream portion of the exhaust pipe 7. An air-fuel ratio sensor 23 of generating an electric signal corresponding to a ratio of the air to a burnt fuel is installed on an upstream side of the exhaust gas purification catalyst 22.

Moreover, a turbocharger (T/C) 36, which is a supercharger including a compressor 31 and a turbine 32 integrally rotating with the compressor 31, is installed in intake/exhaust systems constructed by the intake pipe 2 and the exhaust pipe 7.

The turbine 32 is installed on the upstream side of the exhaust gas purification catalyst 22 on the exhaust pipe 7, and is rotationally driven by the exhaust gas flowing in the exhaust pipe 7. Moreover, the compressor 31 is installed on a downstream side of the AFS 12 on the intake pipe 2, and is rotationally driven by the rotation of the turbine 32 to compress the air in the intake passage.

An air bypass valve (hereinafter referred to as "ABV") 33 for bypassing the compressed air to the intake pipe 2 so as to prevent a supercharging pressure from excessively increasing so that the compressed air flows backward to damage the turbine 32 mainly when an accelerator is released is installed on the downstream side of the compressor 31. An intercooler (hereinafter referred to as "I/C") 30 for cooling the air heated due to an adiabatic expansion by the compressor 31 is provided on a downstream side of the ABV 33.

An electronically-controlled throttle valve 4 for adjusting an air amount fed to the engine 1 is installed on a downstream side of the I/C 30. A throttle position sensor 14 for generating an electric signal corresponding to an opening degree of the throttle valve 4 is connected to the throttle valve 4. A throttle upstream pressure sensor 35 for generating an electric signal corresponding to an air pressure between the I/C 30 and the throttle valve 4 is provided on an upstream side of the throttle valve 4.

Further, an intake manifold 5 including a surge tank for restraining an intake air pulsation is installed on a downstream side of the throttle valve 4 on the intake pipe 2. An intake manifold pressure sensor 16 and an intake manifold temperature sensor 16 for respectively generating electric signals corresponding to an air pressure and a temperature in a space from the surge tank to the intake manifold 5 are provided on the intake manifold 5.

Moreover, an injector 17 for injecting a fuel is installed on a downstream side of the intake manifold 5 on the intake pipe 2. It should be noted that the injector 17 may be provided so as to directly inject the fuel into the cylinder 8.

An ignition plug 18 for igniting a combustible mixture generated by mixing the air taken into the engine 1 and the fuel injected from the injector 17 with each other, and an ignition coil 19 for supplying the ignition plug 18 with a current for igniting a spark are installed at a top portion of the cylinder 8. Moreover, an intake valve 20 for adjusting an air amount introduced from the intake passage to the cylinder 8, and an exhaust valve 21 for adjusting an air amount exhausted from the cylinder 8 to the exhaust passage of the engine 1 are provided on the cylinder 8.

It should be noted that a variable valve timing mechanism (hereinafter referred to as "VVT") for varying timings of opening/closing a valve or a variable valve lift mechanism (hereinafter referred to as "VVL") for varying a lift amount of a valve may be installed on both or any one of respective camshafts for the intake valve 20 and the exhaust valve 21.

A waste gate valve 34 for bypassing the exhaust gas to an exhaust bypass passage so as not to damage the engine even when the supercharging pressure increases at a high rotation/high load is installed on an upstream side of the turbine 32. On this occasion, any one of a pressure type of controlling a pressure applied to a diaphragm and an electric type of directly instructing a valve opening degree may be used as a type for driving the waste gate valve 34.

Figure 2:
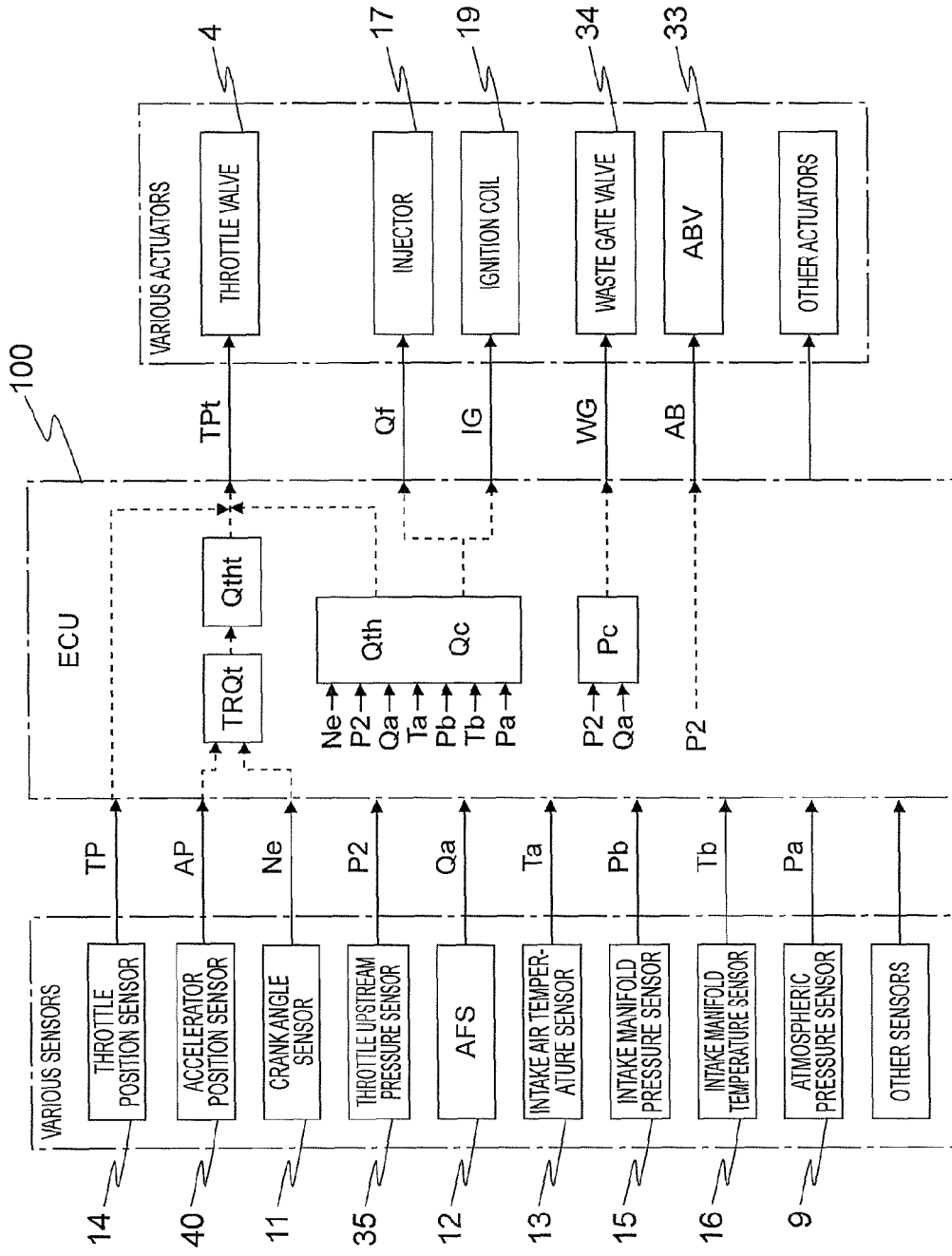
FIG. 2 is a block configuration diagram illustrating the cylinder intake air amount estimation apparatus for an internal combustion engine according to the first embodiment of the present invention.

FIG. 2 is a block configuration diagram illustrating the cylinder intake air amount estimation apparatus for an internal combustion engine according to the first embodiment of the present invention. In FIG. 2, an electronic control unit (hereinafter referred to as "ECU") 100 is mainly constructed by a microcomputer including a CPU for carrying out arithmetic operations, a ROM for storing program data and fixed value data, and a RAM capable of updating stored data, thereby successively rewriting the data.

It should be noted that a per-area density calculation part, an all-area average density calculation part, a virtual intake manifold volume calculation part, and a cylinder intake air amount calculation part, which are described later, are stored as program data in the ECU 100.

Moreover, the ECU 100 carries out various types of control for the engine 1 based on an operation state of the engine 1 obtained every moment by executing various control programs stored in the ROM. In other words, the ECU 100 inputs detection signals from various sensors, calculates a target throttle opening degree, a fuel injection amount, an ignition timing, and the like based on the signals, and outputs signals for driving various actuators.

Specifically, electric signals from the throttle position sensor 14, the crank angle sensor 11, the throttle upstream pressure sensor 35, the AFS 12, the intake air temperature sensor 13, the intake manifold pressure sensor 15, and the intake manifold temperature sensor 16 are input to the ECU 100.

Moreover, signals from an accelerator position sensor 40 and an atmospheric pressure sensor 9, which are not shown in FIG. 1, are also input to the ECU 100. It should be noted that the accelerator position sensor 40 generates an electric signal corresponding to an operation amount of the accelerator installed at the foot a driver seat. Moreover, the atmospheric pressure sensor 9 generates an electric signal corresponding to the atmospheric pressure, and is installed in a neighborhood of the air cleaner 3 of FIG. 1, or installed on a circuit board of the ECU 100.

Further, electric signals from sensors other than the above-mentioned sensors are also input to the ECU 100. On this occasion, examples of the other sensors include the air-fuel ratio sensor 23, a knock sensor (not shown) for detecting, for example, a vibration of a cylinder block of the engine 1, a water temperature sensor (not shown) for detecting a coolant temperature of the engine 1, and a vehicle speed sensor (not shown) for detecting a vehicle speed.

Moreover, the throttle valve 4, the injector 17, the ignition coil 19, the waste gate valve 34, and the ABV 33 are connected to an output side of the ECU 100. Moreover, the ECU 100 is also connected to actuators other than the actuators described above. On this occasion, examples of the other actuators include an actuator (not shown) for driving the VVT installed on the intake valve 20 and the exhaust valve 21.

The ECU 100 calculates a target output torque TRQt required by the driver based on an engine rpm Ne calculated based on a crank angle cycle from the crank angle sensor 11, and an accelerator opening degree AP from the accelerator position sensor 40. Moreover, the ECU 100 calculates a target throttle intake air amount Qtht required for attaining the target output torque TRQt.

Further, the ECU 100 calculates a target throttle opening degree TPt required to attain the target throttle intake air amount Qtht, and drives the throttle valve 4 based on the target throttle opening degree TPt. It should be noted that feedback control by using a throttle opening degree TP from the throttle position sensor 14 is also carried out in order to highly precisely realize the target throttle opening degree TPt.

Moreover, the ECU 100 calculates a cylinder intake air amount Qc entering the cylinder 8 and a throttle intake air amount Qth passing through a throttle part by using a physical model of the intake system described later based on the engine rpm Ne, a throttle upstream pressure P2 from the throttle upstream pressure sensor 35, an AFS intake air amount Qa from the AFS 12, an intake air temperature Ta from the intake air temperature sensor 13, an intake manifold pressure Pb from the intake manifold pressure sensor 15, an intake manifold temperature Tb from the intake manifold temperature sensor 16, and an atmospheric pressure Pa from the atmospheric pressure sensor 9.

Further, the ECU 100 drives the injector 17 so that the fuel injection amount is a fuel injection amount Qf for realizing a target air-fuel ratio for providing appropriate exhaust gases and exhaust temperature based on the cylinder intake air amount Qc, and drives the ignition coil 19 so as to realize an appropriate ignition timing IG for preventing abnormal combustions such as knocking.

It should be noted that feedback control based on the target air-fuel ratio and the output value of the air-fuel ratio sensor 23 is also carried out for the calculation of the fuel injection amount Qf. Moreover, feedback control for the target throttle opening degree TPt by using the throttle intake air amount Qth is also carried out in order to highly precisely realize the target throttle intake air amount Qtht.

Moreover, the ECU 100 calculates, for example, a compressor drive force Pc described in Japanese Patent Application Laid-open No. 2013-224596 based on the AFS intake air amount Qa and the throttle upstream pressure P2. Moreover, the ECU 100 calculates a waste gate opening degree WG for preventing an intake system pressure and an engine output from excessively increasing based on the compressor drive force Pc, thereby driving the waste gate valve 34. Moreover, the ECU 100 calculates an ABV opening degree AB so as to prevent the throttle upstream pressure P2 from excessively increasing by an unintended excessive supercharging, thereby driving the ABV 33.

The engine control is carried out in this way in the ECU 100. On this occasion, the cylinder intake air amount Qc taken into the cylinder 8 of the engine 1 needs to be highly precisely calculated in order to highly precisely control the output torque, the air-fuel ratio, the ignition timing, and the like of the engine 1. Thus, a detailed description is now given of the physical model of the intake system for highly precisely calculating the cylinder intake air amount Qc from the AFS intake air amount Qa detected by the AFS 12.

Figure 3:
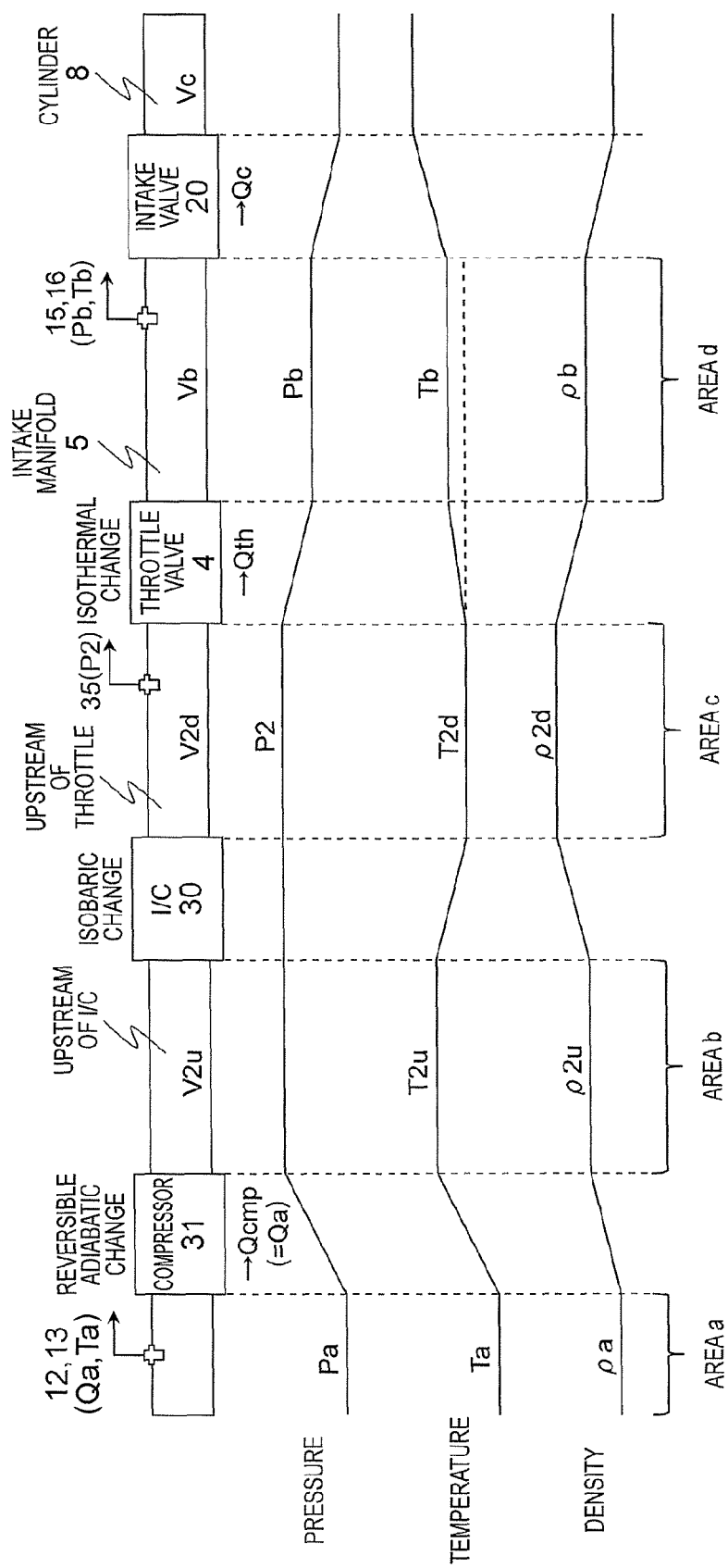
FIG. 3 is an explanatory diagram illustrating a state change of the air and sensors for detecting the state change in each of areas of the control system for an engine including a turbocharger to which the cylinder intake air amount estimation apparatus for an internal combustion engine according to the first embodiment of the present invention is applied.

FIG. 3 is an explanatory diagram illustrating state changes of the air and sensors detecting the state change in each of areas of the control system for an engine including a turbocharger to which the cylinder intake air amount estimation apparatus for an internal combustion engine according to the first embodiment of the present invention is applied. In FIG. 3, the following definitions are provided (n: stroke number).

Qcmp (n): average value of compressor intake air amount during 1 stroke [g/s]
Qa(n): average value of AFS intake air amount during 1 stroke [g/s]
Qth(n): average value of throttle intake air amount during 1 stroke [g/s]
Qc(n): average value of cylinder intake air amount during 1 stroke [g/s]
ΔT(n): time period of 1 stroke [s]
V2u: I/C upstream volume (volume of compressor to I/C) [m³]
V2d: I/C downstream volume (volume of I/C to throttle) [m³]
Vb: intake manifold volume (volume of throttle to cylinder) [m³]
Vc: cylinder stroke volume per 1 cylinder [m³]
Pa(n): average value of atmospheric pressure during 1 stroke [kPa]
P2 (n): average value of throttle upstream pressure during 1 stroke [kPa]
Pb(n): average value of intake manifold pressure during 1 stroke [kPa]
Ta(n): average value of intake air temperature during 1 stroke [K]
T2u(n): average value of I/C upstream temperature during 1 stroke [K]
T2d(n): average value of I/C downstream temperature during 1 stroke [K]
Tb(n): average value of intake manifold temperature during 1 stroke [K]
ρa(n): average value of atmospheric density during 1 stroke [g/m³]
ρ2u(n): average value of I/C upstream density during 1 stroke [g/m³]
ρ2d(n): average value of I/C downstream density during 1 stroke [g/m³]
ρb(n): average value of intake manifold density during 1 stroke [g/m³]

A description is now given of the state change of the air in each of the areas of FIG. 3. First, an upstream side (area "a") of the compressor 31 is open to the atmosphere, and basically has the atmospheric pressure Pa (sensor measured value) and the intake air temperature Ta (sensor measured value). A pressure loss by the air cleaner 3 and the like are conceivable in a strict sense, but the pressure loss and the like are neglected.

Then, the air is compressed by a reversible adiabatic change in the compressor 31, and hence on the downstream side (area "b") of the compressor 31, the pressure and the temperature increase on the downstream side (area "b") of the compressor 31, and the density also increases. Then, the air passes through the I/C 30, and when a pressure loss in the I/C 30 is ignored, only the temperature decreases, and the density increases on the downstream side (area "c") of the I/C 30.

Based on this idea, a state change observed when the air passes through the I/C 30 is an isobaric change, and hence the pressure is common to the areas "b" and "c" at the throttle upstream pressure P2 (sensor measured value), and the temperature is an I/C upstream temperature $T2u$ in the area "b" and is an I/C downstream temperature $T2d$ in the area "c".

Then, the air passes through the throttle valve 4, is throttled, is then expanded on this occasion, and is accumulated in the intake manifold. Thus, the change from the state before the throttle to the state after the throttle is an isothermal change, and hence only the pressure decreases and the density also decreases. However, the heat is also received from the engine 1 side, and hence the temperature slightly increases. As a result, the pressure in an area "d" is the intake manifold pressure Pb (sensor measured value), and the temperature in the area "d" is the intake manifold temperature Tb (sensor measured value).

A description is now given of a method (per-area density calculation part) of calculating the density in each of the areas based on the above-mentioned state change. First, both the atmospheric pressure Pa and the intake air temperature Ta in the area "a" are the sensor measured values, and hence the density ρa in the area "a" can be calculated based on a state equation represented by Equation (1). R in Equation (1) is the gas constant.

$$P_a = \rho_a \cdot R \cdot T_a \quad \therefore \quad \rho_a = \frac{P_a}{R \cdot T_a} \qquad (1)$$

Then, a density ρ2u in the area "b" is calculated. An I/C upstream temperature T2u, which is the temperature in the area "b", has not been calculated, and is thus calculated first. On this occasion, a change from a state before the compressor 31 to a state after the compressor 31 can be considered as the reversible adiabatic change, and hence Equation (2)

representing the isentropic change holds true. Thus, the I/C upstream temperature T2$u$ can be calculated by using Equation (2). When an adiabatic efficiency η$ad$ of the compressor 31 is low, and the change cannot be considered as the reversible adiabatic change, an equation in parentheses reflecting the adiabatic efficiency η$ad$ may be used. κ in Equation (2) is a ratio of specific heat.

$$\frac{T_a}{P_a^{\frac{\kappa-1}{\kappa}}} = \frac{T_{2u}}{P_2^{\frac{\kappa-1}{\kappa}}} \quad \therefore \quad T_{2u} = T_a \cdot \left(\frac{P_2}{P_a}\right)^{\frac{\kappa-1}{\kappa}} \tag{2}$$

$$\left(T_{2u} = T_a \cdot \left\{\frac{(P_2/P_a)^{\frac{\kappa-1}{\kappa}} - 1}{\eta_{ad}} + 1\right\}\right)$$

On this occasion, after the I/C upstream temperature T2$u$ is acquired, the I/C upstream density ρ2$u$ can be calculated based on a state equation represented by Equation (3).

$$P_2 = \rho_{2u} \cdot R \cdot T_{2u} \quad \therefore \quad \rho_{2u} = \frac{P_2}{R \cdot T_{2u}} \tag{3}$$

Then, regarding a calculation method for a density ρ2$d$ in the area "c", an I/C downstream temperature T2$d$, which is a temperature in the area "c", has not been calculated, and hence the state equation cannot be used for the calculation. Moreover, the air passes through the I/C 30 and the temperature thus decreases as described above, but an amount of the decrease in temperature is greatly influenced by a cooling capability of the I/C 30 and an outside air amount for the cooling, and hence it is difficult to simply estimate the temperature decrease amount.

Then, the fact that the change from the state before the throttle valve 4 to the state after the throttle valve 4 is the isothermal change but accompanies a slight temperature change is focused on, and the intake manifold temperature Tb, which is the sensor measured value, can be used to approximate the I/C downstream temperature T2$d$ based on, for example, Equation (4). Temporarily, values of coefficients Ka and Kb may be set respectively to 1.0 and 0.0, but the precision can be increased more by acquiring approximated coefficients from measurement results.

$$T_{2d} = K_a \cdot T_b + K_b \tag{4}$$

On this occasion, after the I/C downstream temperature T2$d$ is acquired, the density ρ2$d$ in the area "c" can be calculated based on a state equation represented by Equation (5).

$$P_2 = \rho_{2d} \cdot R \cdot T_{2d} \quad \therefore \quad \rho_{2d} = \frac{P_2}{R \cdot T_{2d}} \tag{5}$$

Then, a density ρb in the intake manifold 5 in the area "d" can be calculated based on a state equation represented by Equation (6) by using the intake manifold pressure Pb and the intake manifold temperature Tb, which are sensor measured values.

$$P_b = \rho_b \cdot R \cdot T_b \quad \therefore \quad \rho_b = \frac{P_b}{R \cdot T_b} \tag{6}$$

The densities in the areas "a" to "d" can be calculated by using the above-mentioned method.

A description is now given of a method (all-area average density calculation part, virtual intake manifold volume calculation part, and cylinder intake air amount calculation part) of calculating the cylinder intake air amount Qc based on the AFS intake air amount Qa. In an area from the downstream of the compressor 31 to the upstream of the intake valve 20, namely, an area "bcd", which is a collection of the areas "b", "c", and "d" (total volume Vall[m$^3$] and average density ρave[g/m$^3$]), when the mass conservation law is applied to the fresh air, Equation (7) holds true. It should be noted that the compressor intake air amount Qcmp is equal to the AFS intake air amount Qa.

$$Q_a(n) \cdot \Delta T(n) - Q_c(n) \cdot \Delta T(n) = \{\rho_{ave}(n) - \rho_{ave}(n-1)\} \cdot V_{all} \tag{7}$$

On this occasion, the total volume Vall and the average density ρave are respectively defined by Equations (8) and (9).

$$V_{all} = V_{2u} + V_{2d} + V_b \tag{8}$$

$$\rho_{ave}(n) = \frac{\rho_{2u}(n) \cdot V_{2u} + \rho_{2d}(n) \cdot V_{2d} + \rho_b(n) \cdot V_b}{V_{all}} \tag{9}$$

Then, the cylinder intake air amount Qc(n) can be calculated based on Equation (10) when a volume efficiency acquired by considering the intake manifold as a reference, which is a volume efficiency of the air entering the cylinder 8 from the intake manifold 5, is Kv(n). When the cylinder intake air amount Qc(n) is calculated by means of the S/D method, Equation (10) is used.

$$Q_c(n) \cdot \Delta T(n) = K_v(n) \cdot \rho_b(n) \cdot V_c \tag{10}$$

On this occasion, the total volume and the average density are respectively Vall and ρave in the area "bcd", and hence air of ρave×Vall in mass exists in this area. Then, if the density of the air existing in the area "bcd" is equal to the intake manifold density ρb, a relationship with a volume (hereinafter referred to as "virtual intake manifold volume") occupied by air having the same mass is represented by Equation (11).

$$\rho_{ave}(n) \cdot V_{all} = \rho_b(n) \cdot V_b'(n) \tag{11}$$

On this occasion, Equation (12) is acquired by assigning Equation (11) to Equation (7).

$$Q_a(n) \cdot \Delta T(n) - Q_c(n) \cdot \Delta T(n) = \rho_{ave}(n) \cdot V_{all} - \rho_{ave}(n-1) \cdot V_{all} \tag{12}$$
$$= \rho_b(n) \cdot V_b'(n) - \rho_b(n-1) \cdot V_b'(n-1)$$

In the following, a description is given assuming that the density in the area "bcd" is the intake manifold density ρb, and the volume is the virtual intake manifold volume Vb'. Equation (13) is acquired by assigning Equation (10) to Equation (12), thereby eliminating the intake manifold density ρb.

$$Q_a(n) \cdot \Delta T(n) - Q_c(n) \cdot \Delta T(n) = \tag{13}$$
$$\frac{Q_c(n) \cdot \Delta T(n)}{K_v(n) \cdot V_c} \cdot V_b'(n) - \frac{Q_c(n-1) \cdot \Delta T(n-1)}{K_v(n-1) \cdot V_c} \cdot V_b'(n-1)$$

Moreover, Equation (14) is acquired by solving Equation (13) in terms of Qc(n)·ΔT(n).

$$Q_c(n) \cdot \Delta T(n) = \qquad (14)$$
$$\frac{K_v(n) \cdot V_c}{K_v(n) \cdot V_c + V'_b(n)} \cdot \frac{V'_b(n-1)}{K_v(n-1) \cdot V_c} \cdot Q_c(n-1) \cdot \Delta T(n-1) +$$
$$\frac{K_v(n) \cdot V_c}{K_v(n) \cdot V_c + V'_b(n)} \cdot Q_a(n) \cdot \Delta T(n)$$

Further, Equation (15) is acquired by multiplying both sides of Equation (14) by Vb'(n)/(Kv(n)·Vc), and rearranging the equation.

$$\frac{V'_b(n)}{K_v(n) \cdot V_c} \cdot Q_c(n) \cdot \Delta T(n) = \qquad (15)$$
$$\frac{V'_b(n)}{K_v(n) \cdot V_c + V'_b(n)} \cdot \frac{V'_b(n-1)}{K_v(n-1) \cdot V_c} \cdot Q_c(n-1) \cdot \Delta T(n-1) +$$
$$\frac{K_v(n) \cdot V_c}{K_v(n) \cdot V_c + V'_b(n)} \cdot \frac{V'_b(n)}{K_v(n) \cdot V_c} \cdot Q_a(n) \cdot \Delta T(n)$$

On this occasion, Equation (17) is acquired by assigning intermediate variables defined by Equation (16) to Equation (15). The cylinder intake air amount Qc can be calculated by using Equation (17) based on the AFS intake air amount Qa.

$$W(n) = \frac{V'_b(n)}{K_v(n) \cdot V_c}, \qquad (16)$$
$$K' = \frac{V'_b(n)}{K_v(n) \cdot V_c + V'_b(n)},$$
$$1 - K' = \frac{K_v(n) \cdot V_c}{K_v(n) \cdot V_c + V'_b(n)}$$

$$W(n) \cdot Q_c(n) \cdot \Delta T(n) = \qquad (17)$$
$$K' \cdot W(n-1) \cdot Q_c(n-1) \cdot \Delta T(n-1) + (1 - K') \cdot W(n) \cdot Q_a(n) \cdot \Delta T(n)$$

When Equation (17) derived as described above is calculated, for example, in interrupt processing carried out each predetermined crank angle of the crankshaft synchronized with the rotation of the engine 1, Equation (17) serves as an equation of a digital low-pass filter. In other words, the intake system of the engine 1 can be considered as a first-order lag element.

A volume efficiency Kv(n) acquired by considering the intake manifold as a reference is necessary to use Equation (17), and Kv needs to be adapted in advance by using Equation (10). On this occasion, if a mechanism (such as the VVT or VVL) for changing the volume efficiency Kv acquired by considering the intake manifold as a reference does not exist, the number of man-hours for adaptation and the number of maps may be small, but when the intake/exhaust VVT is used, the number of man-hours for adaptation and the number of map are enormous.

Thus, a description is now given of a method of calculating Kv in real time by using the AFS intake air amount Qa and the intake manifold density ρb. In other words, Equation (18) is acquired by assigning Equation (10) to Equation (12), eliminating the cylinder intake air amount Qc, and solving Equation (12) in terms of Kv.

$$Q_a(n) \cdot \Delta T(n) - K_v(n) \cdot \rho_b(n) \cdot V_c = \qquad (18)$$
$$\rho_b(n) \cdot V'_b(n) - \rho_b(n-1) \cdot V'_b(n-1)$$
$$\therefore K_v(n) = \frac{Q_a(n) \cdot \Delta T(n) - \{\rho_b(n) \cdot V'_b(n) - \rho_b(n-1) \cdot V'_b(n-1)\}}{\rho_b(n) \cdot V_c}$$

The volume efficiency Kv acquired by considering the intake manifold as a reference can be calculated in real time in this way (hereinafter referred to as "real time Kv"). The real time Kv calculated by Equation (18) may be mixed with noise caused by a phase difference and minute measurement noise generated by averaging the sensor output values. Therefore, it is effective to attenuate noise components by filtering the sensor output value used in Equation (18) and the real time Kv calculated by using Equation (18), and using the Kv having the attenuated noise components after the filtering for the calculation by Equation (17).

On this occasion, as the filtering for attenuating the noise components, for example, low-pass filtering, processing of calculating a simple moving average for values in past several strokes, and processing of calculating a weighted moving average (average of differently weighted values in past several strokes) can be used.

A description is now given of a method of calculating the throttle intake air amount Qth required for the feedback control for the target throttle opening degree TPt carried out to highly precisely realize the target throttle intake air amount Qtht.

First, in the case of the control system for an engine including a turbocharger, it is considered that the throttle intake air amount Qth in the steady state operation is equal to the AFS intake air amount Qa and the cylinder intake air amount Qc. However, a response lag occurs during the transient operation, and it cannot thus be considered that the throttle intake air amount Qth is equal to any of the AFS intake air amount Qa and the cylinder intake air amount Qc.

Then, the mass conservation law is newly applied to the fresh air as represented by Equation (19) in the area "d" of FIG. 3, thereby deriving the throttle intake air amount Qth.

$$Q_{th}(n) \cdot \Delta T(n) - Q_c(n) \cdot \Delta T(n) = \{\rho_b(n) - \rho_b(n-1)\} \cdot V_b \qquad (19)$$

Equation (20) is acquired by assigning Equation (10) to Equation (19), thereby eliminating the intake manifold density ρb.

$$Q_{th}(n) \cdot \Delta T(n) - Q_c(n) \cdot \Delta T(n) = \qquad (20)$$
$$\left\{\frac{Q_c(n) \cdot \Delta T(n)}{K_v(n)} - \frac{Q_c(n-1) \cdot \Delta T(n-1)}{K_v(n-1)}\right\} \cdot \frac{V_b}{V_c}$$

Moreover, Equation (22) is acquired by rearranging Equation (20) by using an intermediate variable defined as Equation (21).

$$K = \frac{V_b}{V_b + K_v(n) \cdot V_c} \qquad (21)$$

$$\frac{Q_c(n) \cdot \Delta T(n)}{K_v(n)} = K \cdot \frac{Q_c(n-1) \cdot \Delta T(n-1)}{K_v(n-1)} + (1-K) \cdot \frac{Q_{th}(n) \cdot \Delta T(n)}{K_v(n)} \qquad (22)$$

Then, Equation (23) is acquired by rearranging Equation (22). The throttle intake air amount Qth can be calculated by using Equation (23) based on the cylinder intake air amount Qc calculated by Equation (17) and the real time Kv calculated by Equation (18).

$$\frac{Q_{th}(n) \cdot \Delta T(n)}{K_v(n)} = \frac{1}{1-K} \cdot \frac{Q_c(n) \cdot \Delta T(n)}{K_v(n)} - \frac{K}{1-K} \cdot \frac{Q_c(n-1) \cdot \Delta T(n-1)}{K_v(n-1)} \quad (23)$$

The cylinder intake air amount Qc and the throttle intake air amount Qth can be calculated based on the AFS intake air amount Qa by considering the physical model of the intake system as described above.

Figure 4:
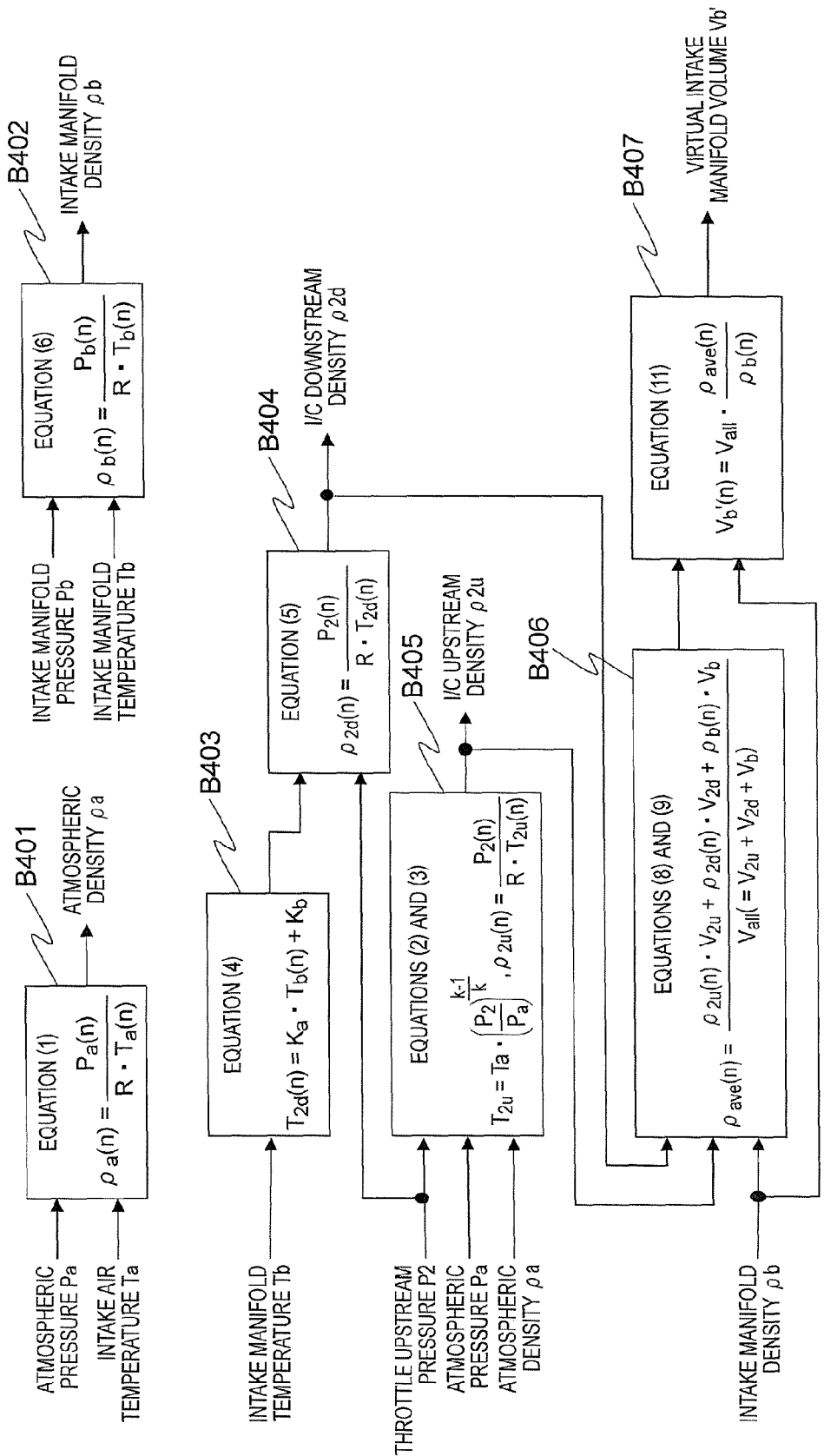
FIG. 4 is a control block diagram illustrating processing of calculating a virtual intake manifold volume in the cylinder intake air amount estimation apparatus for an internal combustion engine according to the first embodiment of the present invention.
Figure 5:
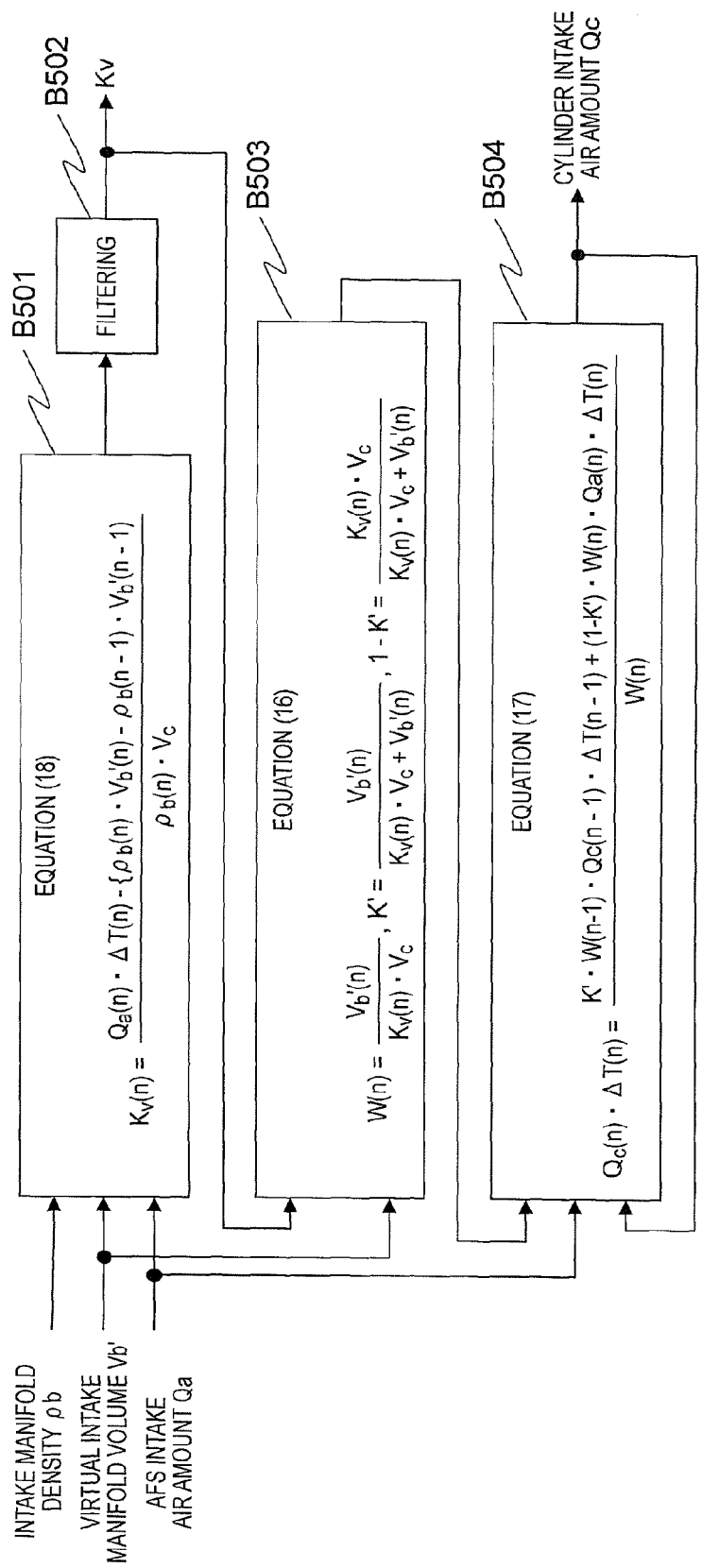
FIG. 5 is a control block diagram illustrating processing of calculating a cylinder intake air amount in the cylinder intake air amount estimation apparatus for an internal combustion engine according to the first embodiment of the present invention.
Figure 6:
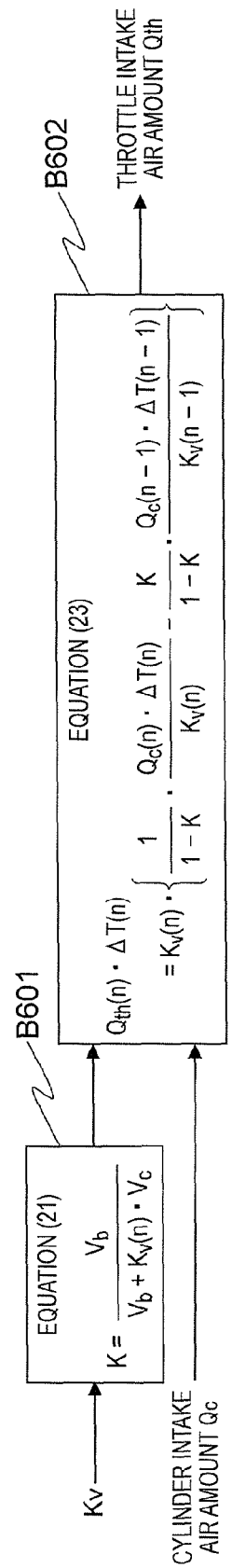
FIG. 6 is a control block diagram illustrating processing of calculating a throttle intake air amount in the cylinder intake air amount estimation apparatus for an internal combustion engine according to the first embodiment of the present invention.

Next, referring to FIGS. 4 to 6, a specific description is given of calculation contents actually carried out based on the physical model of the intake system in the ECU 100. FIG. 4 is a control block diagram illustrating processing of calculating the virtual intake manifold volume Vb', FIG. 5 is a control block diagram illustrating processing for calculating the cylinder intake air amount Qc, and FIG. 6 is a control block diagram illustrating processing of calculating the throttle intake air amount Qth in the cylinder intake air amount estimation apparatus for an internal combustion engine according to the first embodiment of the present invention.

First, a description is given of the method of calculating the virtual intake manifold volume Vb' illustrated in FIG. 4. The calculation processing is carried out in interrupt processing (hereinafter referred to as "B05 interrupt processing") carried out at each predetermined crank angle (for example, BTDC 5 degCA) of the crankshaft synchronized with the rotation of the engine 1.

Moreover, an average of values detected by each of sensors during one stroke is used in some of the following calculations. The average can be acquired by detecting the sensor output value at a predetermined interval (such as 1 millisecond or 10 degCA), and calculating the average of all sensor detected values during a period from the start of the last B05 interrupt processing to the start of the current B05 interrupt processing.

In FIG. 4, in a block B401, the atmospheric density ρa(n) is calculated from the atmospheric pressure Pa(n) and the intake air temperature Ta(n) based on Equation (1). Moreover, in a block B402, the intake manifold density ρb(n) is calculated from the intake manifold pressure Pb(n) and the intake manifold temperature Tb(n) based on Equation (6).

Then, in a block B403, the I/C downstream temperature T2d(n) is calculated from the intake manifold temperature Tb(n) based on Equation (4). The values of the coefficients Ka and Kb used for Equation (4) may be respectively 1.0 and 0.0 temporarily, but the precision can be increased more by acquiring approximated coefficients from measurement results.

Then, in a block B404, the I/C downstream density ρ2d(n) is calculated from the I/C downstream temperature T2d(n) and the throttle upstream pressure P2(n) calculated before based on Equation (5). Moreover, in a block B405, the I/C upstream density ρ2u(n) is calculated from the throttle upstream pressure P2(n), the atmospheric pressure Pa(n), and the intake air temperature Ta(n) based on Equations (2) and (3). On this occasion, the equation for the case where the reversible adiabatic change is considered is assumed, but the equation for the case where the adiabatic efficiency ηad of the compressor 31 is considered may be used.

On this occasion, calculation of an exponential function is necessary for the calculation of Equation (2), but highly precise calculation leads to a high calculation load, and hence values calculated independently in advance may be stored as table values, and a value corresponding to the drive state when used may be searched for and may be used.

Then, in a block B406, the average density ρave(n) is calculated from the I/C upstream density ρ2u(n), the I/C downstream density ρ2d(n), and the intake manifold density ρb(n), which have been calculated before, based on Equations (8) and (9).

Moreover, in a block B407, the virtual intake manifold volume Vb' (n) is calculated from the average density ρave (n) and the intake manifold density ρb(n), which have been calculated before, based on Equation (11). The virtual intake manifold volume Vb'(n) can be acquired from the existing sensor detected values by carrying out the calculation in the sequence described above.

A description is now given of the method of calculating the cylinder intake air amount Qc illustrated in FIG. 5. It should be noted that a calculation timing is after the calculation of the virtual intake manifold volume Vb'(n) in the B05 interrupt processing, and the period ΔT(n) corresponding to the one stroke is calculated from the difference between the previous B05 interrupt processing start time and the current B05 interrupt processing start time. Moreover, a representation (n−1) means a value calculated in the previous B05 interrupt processing.

In FIG. 5, in a block B501, the real time Kv is calculated from the intake manifold densities ρb(n) and ρb(n−1), the virtual intake manifold volumes Vb'(n) and Vb'(n−1), and the AFS intake air amount Qa(n) based on Equation (18). Moreover, in a block B502, filtering for attenuating noise components is carried out.

On this occasion, as the filtering for attenuating the noise components, for example, low-pass filtering, processing of calculating a simple moving average for values in past several strokes, and processing of calculating a weighted moving average (average of differently weighted values in past several strokes) can be used. The real time Kv after the filtering can be calculated in this way.

Then, in a block B503, the intermediate variables are calculated from the real time Kv and the virtual intake manifold volume Vb' (n), which have been calculated before, based on Equation (16). The real time Kv is used on this occasion, but the volume efficiency Kv is not limited to the real time Kv, and a map Kv, which is a map value searched for and calculated depending on an operation state when used from Kv values adapted in advance by using Equation (10) and stored as a map, may be used.

Then, in a block B504, the cylinder intake air amount Qc(n) is calculated from the intermediate variables, the AFS intake air amount Qa(n), and the previous cylinder intake air amount Qc(n−1), which have been calculated before, based on Equation (17). The cylinder intake air amount Qc can be calculated from the AFS intake air amount Qa based on the physical model of the intake system in this way.

A description is now given of the method of calculating the throttle intake air amount Qth illustrated in FIG. 6. It should be noted that a calculation timing is after the calculation of the cylinder intake air amount Qc(n) in the B05 interrupt processing.

In FIG. 6, in a block B601, the intermediate variable is calculated from the real time Kv or the map Kv based on Equation (21). Then, in a block B602, the throttle intake air amount Qth is calculated from the intermediate variable and the cylinder intake air amounts $Qc(n)$ and $Qc(n-1)$, which have been calculated before, based on Equation (23).

As described above, when the calculation is carried out in the sequence illustrated in FIGS. 4 to 6, the physical model of the intake system can be installed in the ECU 100, and the physical model can be used in the engine control system. The cylinder intake air amount Qc and the throttle intake air amount Qth calculated in this way can be used to highly precisely control the output torque, the air-fuel ratio, the ignition timing, and the like in the control system for an engine including a turbocharger.

The cylinder intake air amount Qc and the throttle intake air amount Qth can be calculated in completely the same way as long as a system has the configuration (in the sequence of the compressor 31, the I/C 30, and the throttle valve 4 from the upstream) of the intake system illustrated in FIG. 3 even in control systems for an engine including a mechanical supercharger and an electric charger, which are not limited to the turbocharger.

As described above, according to the first embodiment, there is provided a cylinder intake air amount estimation apparatus for an internal combustion engine in which a path from an intake opening of an intake pipe of the internal combustion engine to a cylinder of the internal combustion engine is partitioned into a plurality of areas different in a density of air from one another, the cylinder intake air amount estimation apparatus being configured to calculate, based on an intake opening intake air amount taken into the internal combustion engine from the intake opening, a cylinder intake air amount entering the cylinder, the cylinder intake air amount estimation apparatus including: an intake air amount detection part provided close to the intake opening so as to detect the intake opening intake air amount; a per-area density calculation part for calculating the density of each of the plurality of areas; an all-area average density calculation part for calculating, based on an intake pipe volume and the calculated density in each of the plurality of areas, amass of the air existing in all of the plurality of areas and an average density of all of the plurality of areas; a virtual intake manifold volume calculation part for calculating, based on the mass of the air existing in all of the plurality of areas and a total volume of the intake pipe, a virtual intake manifold volume by assuming that the density of the air in all of the plurality of areas is equal to a density in an intake manifold closest to the cylinder; and a cylinder intake air amount calculation part for calculating the cylinder intake air amount based on the intake opening intake air amount by using a physical model of an intake system derived based on a volume efficiency acquired by considering the intake manifold as a reference, which is a volume efficiency of the air entering the cylinder from the intake manifold, the virtual intake manifold volume, and a stroke volume per cylinder, the physical model being adapted to a control system for an engine including a supercharger.

In other words, based on the total air amount in the plurality of areas different in density from each other from the intake air amount detection part to the cylinder, the virtual intake manifold volume is calculated by assuming that the densities in all the areas are equal to the intake manifold density, and the response lag of the intake system is transformed into the physical model based on the volume efficiency acquired by considering the intake manifold as a reference, the virtual intake manifold volume, and the stroke volume per cylinder.

Therefore, the cylinder intake air amount can be highly precisely calculated from the AFS intake air amount by means of the physical model of the intake system simulating the response lag from the AFS part to the cylinder in the control system for an engine including a supercharger, which is configured to calculate the cylinder intake air amount by means of the AFS method.

Second Embodiment

In the first embodiment, the control system for an engine including a turbocharger is mentioned as an example, and a description has been given of the physical model of the intake system and the method of installing the physical model in the ECU. Moreover, the physical model can be applied to the control system for an engine including a mechanical supercharger or electric charger as long as the system has the configuration (in the sequence of the compressor 31, the I/C 30, and the throttle valve 4 from the upstream) of the intake system illustrated in FIG. 3 as described above.

On this occasion, the configuration of the intake system may be different from that in FIG. 3 in the control system for an engine including a mechanical supercharger. In other words, the intake system configured in a sequence of the throttle valve, the mechanical supercharger (hereinafter referred to as "S/C"), and the I/C from the upstream is also general. Then, in a second embodiment of the present invention, a description is given of a case where the physical model is applied to the control system for an engine including a mechanical supercharger having the intake system configured in the sequence of the throttle valve, the S/C, and the I/C from the upstream.

A description of the basic engine control is the same as that of the first embodiment, and a description is now given referring to only drawings necessary when the physical model of the intake system according to the present invention is applied to the control system for an engine including a mechanical supercharger.

Figure 7:
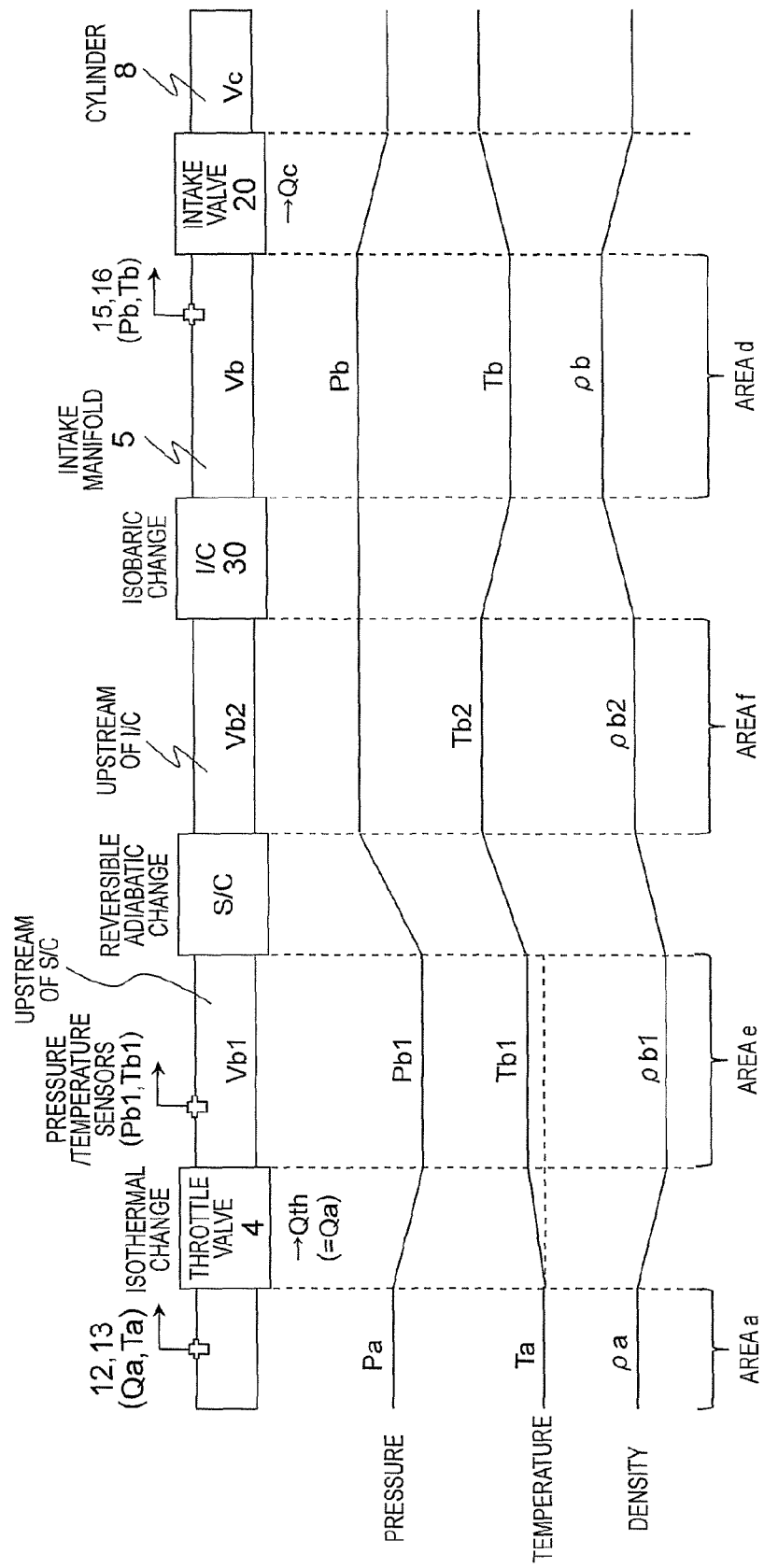
FIG. 7 is an explanatory diagram illustrating a state change of the air and the sensors for detecting the state change in each of areas of a control system for an engine including a mechanical supercharger to which a cylinder intake air amount estimation apparatus for an internal combustion engine according to a second embodiment of the present invention is applied.

FIG. 7 is an explanatory diagram illustrating a state change of the air and sensors detecting the state change in each of areas of the control system for an engine including a mechanical supercharger to which a cylinder intake air amount estimation apparatus for an internal combustion engine according to the second embodiment of the present invention is applied.

A description is now given of common points and different points between FIGS. 3 and 7. First, such a point that the AFS 12 and the intake air temperature sensor 13 are installed on the most upstream portion of the intake system and such a point that the intake manifold pressure sensor 15 and the intake manifold temperature sensor 16 are installed on the intake manifold 5, which is the most downstream portion, are common. Thus, these areas are referred to as area "a" and area "d" as in FIG. 3.

Then, such a point that the throttle valve 4 is installed downstream of the AFS 12, and then the S/C and the I/C are installed in this sequence is different. Thus, an area between the throttle valve 4 and the S/C is referred to as area "e", and an area between the S/C and the I/C 30 is referred to as area "f." Moreover, such a point that a pressure sensor and a temperature sensor are installed in the area "e" is also different.

While the control system for an engine including a turbocharger controls the supercharging pressure by using the waste gate valve 34 and the ABV 33, the control system for an engine including a mechanical supercharger controls the supercharging pressure by using an electromagnetic clutch which controls a connection state between the crankshaft and the S/C, and an ABV which communicates the areas "e" and "f" in FIG. 7 with each other.

Moreover, as the control system for an engine including a turbocharger, the control system for an engine including a supercharger can calculate a compressor drive force Pc described in Japanese Patent Application Laid-open No. 2013-224596, and can control the electromagnetic clutch and the ABV based on the compressor drive force Pc so as to prevent the intake system pressure and the engine output from excessively increasing. Based on the above description, in FIG. 7, the following definitions are provided (n: stoke number).

Qa(n): average value of AFS intake air amount during 1 stroke [g/s]
Qth(n): average value of throttle intake air amount during 1 stroke [g/s]
Qc(n): average value of cylinder intake air amount during 1 stroke [g/s]
ΔT(n): time period of 1 stroke [s]
Vb1: S/C upstream volume (volume of throttle to S/C) [m³]
Vb2: I/C upstream volume (volume of S/C to I/C) [m³]
Vb: intake manifold volume (volume of I/C to cylinder) [m³]
Vc: cylinder stroke volume per 1 cylinder [m³]
Pa(n): average value of atmospheric pressure during 1 stroke [kPa]
Pb1 (n): average value of S/C upstream pressure during 1 stroke [kPa]
Pb(n): average value of intake manifold pressure during 1 stroke [kPa]
Ta(n): average value of intake air temperature during 1 stroke [K]
Tb1(n): average value of S/C upstream temperature during 1 stroke [K]
Tb2(n): average value of I/C upstream temperature during 1 stroke [K]
Tb (n): average value of intake manifold temperature during 1 stroke [K]
ρa (n): average value of atmospheric density during 1 stroke [g/m³]
ρb1 (n): average value of S/C upstream density during 1 stroke [g/m³]
ρb2 (n): average value of I/C upstream density during 1 stroke [g/m³]
ρb(n): average value of intake manifold density during 1 stroke [g/m³]

A description is now given of the state change of the air in each of the areas of FIG. 7. First, an upstream side (area "a") of the throttle valve 4 is open to the atmosphere, and basically has the atmospheric pressure Pa (sensor measured value) and the intake air temperature Ta (sensor measured value). A pressure loss by the air cleaner 3 and the like are conceivable in a strict sense, but the pressure loss and the like are neglected.

Then, the air passes through the throttle valve 4, is throttled, is then expanded, and stays in the area "e". Thus, a change from a state before the throttle to a state after the throttle is an isothermal change, and hence only the pressure decreases and the density also decreases. However, the heat is also received from the engine 1 side, and hence the temperature thus slightly increases. As a result, the pressure in the area "e" is an S/C upstream pressure Pb1 (sensor measured value), and the temperature in the area "e" is an S/C upstream temperature Tb1 (sensor measured value).

Then, the air is compressed by a reversible adiabatic change in the S/C, and hence on the downstream side (area "f") of the S/C, the pressure and the temperature increase, and the density also increases. Then, the air passes through the I/C 30, and when a pressure loss in the I/C 30 is ignored, only the temperature decreases, and the density increases on the downstream side (area "d") of the I/C 30.

Based on this idea, a state change observed when the air passes through the I/C 30 is an isobaric change, and hence the pressure is common to the areas "f" and "d" at the intake manifold pressure Pb (sensor measured value), and the temperature is an I/C upstream temperature Tb2 in the area "f" and is an intake manifold temperature Tb (sensor measured valve) in the area "d".

A description is next given of a method (per-area density calculation part) of calculating the density in each of the areas based on the above-mentioned stage change. First, both the atmospheric pressure Pa and the intake air temperature Ta in the area "a" are the sensor measured values, and hence the density ρa in the area "a" can be calculated based on the state equation represented by Equation (1) described in the first embodiment. Also, in the following, if the equation described in the first embodiment is used, only the number of the equation is referred to.

Then, the S/C upstream pressure Pb1 and the S/C upstream temperature Tb1 in the area "e" are the sensor measured values, and hence the density ρb1 in the area "e" can thus be calculated based on Equation (24) similar to the state equation represented by Equation (1).

$$P_{b1} = \rho_{b1} \cdot R \cdot T_{b1} \quad (24)$$
$$\therefore \rho_{b1} = \frac{P_{b1}}{R \cdot T_{b1}}$$

Then, a density ρb2 in the area "f" is calculated. An I/C upstream temperature Tb2, which is the temperature in the area "f", has not been calculated, and is thus calculated first. On this occasion, a change from a state before the S/C to a state after the S/C can be considered as the reversible adiabatic change, and hence Equation (25) representing the isoentropic change holds true. Thus, the I/C upstream temperature T22 can be calculated by using Equation (25). When an adiabatic efficiency ηad of the SIC is low, and the change cannot be considered as the reversible adiabatic change, an equation in parentheses reflecting the adiabatic efficiency ηad may be used. κ in Equation (25) is a ratio of specific heat.

$$\frac{T_{b1}}{P_{b1}^{\frac{\kappa-1}{\kappa}}} = \frac{T_{b2}}{P_b^{\frac{\kappa-1}{\kappa}}} \quad (25)$$

$$\therefore T_{b2} = T_{b1} \cdot \left(\frac{P_b}{P_{b1}}\right)^{\frac{\kappa-1}{\kappa}}$$

$$\left(T_{b2} = T_{b1} \cdot \left\{\frac{(P_b/P_{b1})^{\frac{\kappa-1}{\kappa}} - 1}{\eta_{ad}} + 1\right\}\right)$$

On this occasion, after the I/C upstream temperature Tb2 is acquired, the I/C upstream density ρb2 can be calculated based on a state equation represented by Equation (26).

$$P_b = \rho_{b2} \cdot R \cdot T_{b2} \quad (26)$$
$$\therefore \rho_{b2} = \frac{P_b}{R \cdot T_{b2}}$$

Then, a density ρb in the intake manifold 5 in the area "d" can be calculated based on the state equation represented by Equation (6) by using the intake manifold pressure Pb and the intake manifold temperature Tb, which are sensor measured values. The densities in the areas "a", "e", "f", and "d" can be calculated by using the above-mentioned method.

A description is next given of a method (all-area average density calculation part, virtual intake manifold volume calculation part, and cylinder intake air amount calculation part) of calculating the cylinder intake air amount Qc based on the AFS intake air amount Qa. In an area from the downstream of the throttle valve 4 to the upstream of the intake valve 20, namely, an area "efd", which is a collection of the areas "e", "f", and "d" (total volume Vall[m$^3$] and average density ρave[g/m$^3$]), when the mass conservation law is applied to the fresh air, Equation (7) holds true. It should be noted that the throttle intake air amount Qth is equal to the AFS intake air amount Qa.

On this occasion, the total volume Vall and the average density ρave are respectively defined by Equations (27) and (28).

$$V_{all} = V_{b1} + V_{b2} + V_b \quad (27)$$

$$\rho_{ave}(n) = \frac{\rho_{b1}(n) \cdot V_{b1} + \rho_{b2}(n) \cdot V_{b2} + \rho_b(n) \cdot V_b}{V_{all}} \quad (28)$$

Then, the cylinder intake air amount Qc(n) can be calculated based on Equation (10) when a volume efficiency acquired by considering the intake manifold as a reference is Kv(n). When the cylinder intake air amount Qc(n) is calculated by means of the S/D method, Equation (10) is used.

On this occasion, the total volume and the average density are respectively Vall and pave in the area "efd", and hence air of ρave×Vall in mass exists in this area. Then, if the density of the air existing in the area "efd" is equal to the intake manifold density ρb, a relationship with a volume (virtual intake manifold volume) occupied by air having the same mass is represented by Equation (11).

On this occasion, Equation (12) is acquired by assigning Equation (11) to Equation (7). In the following, a description is given assuming that the density in the area "efd" is the intake manifold density ρb, and the volume is the virtual intake manifold volume Vb'. Equation (13) is acquired by assigning Equation (10) to Equation (12), thereby eliminating the intake manifold density ρb.

Equations (16) and (17) are acquired by arranging Equation (13), and, after all, the cylinder intake air amount Qc can be calculated by using Equations (16) and (17), which are the same as the first embodiment, based on the AFS intake air amount Qa.

The volume efficiency Kv(n) acquired by considering the intake manifold as a reference is necessary to use Equation (17), and the Kv can be calculated by Equation (18) acquired by assigning Equation (10) to Equation (12), thereby eliminating the cylinder intake air amount Qc, and solving Equation (12) in terms of Kv as in the first embodiment.

When the virtual intake manifold volume Vb' is calculated in this way, the subsequent calculation for the cylinder intake air amount Qc and the real time Kv is completely the same as that in the first embodiment. It is considered that the throttle intake air amount Qth is equal to the AFS intake air amount Qa in the second embodiment of the present invention, and the calculation of the throttle intake air amount Qth as in the first embodiment is thus no longer necessary.

Figure 8:
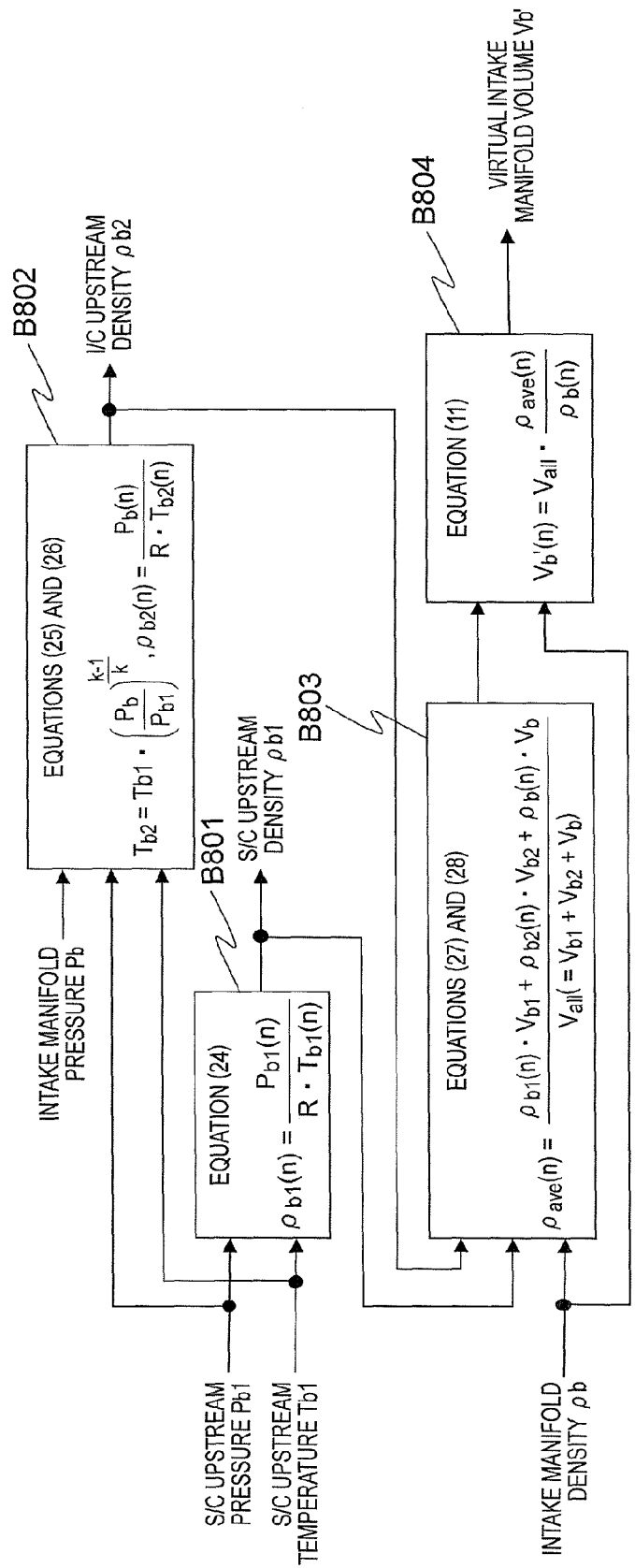
FIG. 8 is a control block diagram illustrating processing of calculating the virtual intake manifold volume in the cylinder intake air amount estimation apparatus for an internal combustion engine according to the second embodiment of the present invention.

Then, referring to FIG. 8, a specific description is given of calculation contents actually carried out based on the physical model of the intake system in the ECU 100. FIG. 8 is a control block diagram illustrating the processing of calculating the virtual intake manifold volume Vb' in the cylinder intake air amount estimation apparatus for an internal combustion engine according to the second embodiment of the present invention. A calculation content after the virtual intake manifold volume Vb' is acquired is the same as that of FIG. 5 of the first embodiment, and a description thereof is therefore omitted.

The calculation processing illustrated in FIG. 8 is carried out in interrupt processing synchronized with the rotation of the engine 1 as in the B05 interrupt processing as illustrated in FIG. 4, which is the calculation processing for the virtual intake manifold volume Vb' according to the first embodiment, and the calculation method for the average and the like are the same.

In FIG. 8, in a block B801, the S/C upstream density ρb1(n) is calculated from the S/C upstream pressure Pb1(n) and the S/C upstream temperature Tb1(n) based on Equation (24).

Then, in a block B802, the I/C upstream density ρb2(n) is calculated from the intake manifold pressure Pb(n), the S/C upstream pressure Pb1(n), and the S/C upstream temperature Tb1(n) based on Equations (25) and (26). On this occasion, the equation for the case where the reversible adiabatic change is considered is assumed, but the equation for the case where the adiabatic efficiency ηad of the compressor 31 is considered may be used. Further, calculation of an exponential function is necessary for the calculation of Equation (25), but highly precise calculation leads to a high calculation load, and hence values calculated independently in advance may be stored as table values, and a value corresponding to the drive state when used may be searched for and may be used.

Then, in a block B803, the average density ρave(n) is calculated from the S/C upstream density ρb1(n), the I/C upstream density ρb2(n), and the intake manifold density ρb(n) calculated similarly to the block B402 of FIG. 4, which have been calculated before, based on Equations (27) and (28).

Moreover, in a block B804, similarly to the block B407 of FIG. 4, the virtual intake manifold volume Vb'(n) is calculated from the average density ρave(n) and the intake manifold density ρb(n), which have been calculated before, based on Equation (11). The virtual intake manifold volume Vb'(n) can be acquired from the existing sensor detected values by carrying out the calculation in the sequence described above.

Subsequently, the cylinder intake air amount Qc can be calculated by applying the virtual intake manifold volume Vb' acquired in FIG. 8 to FIG. 5 described in the first embodiment.

As described above, according to the second embodiment, the physical model of the intake system can be installed in the ECU 100, and the physical model can be used in the engine control system. The cylinder intake air amount Qc calculated in this way can be used to highly precisely control the output torque, the air-fuel ratio, the ignition timing, and the like in the control system for an engine including a mechanical supercharger.

The cylinder intake air amount Qc can be calculated in completely the same way as long as a system has the configuration (in the sequence of the throttle valve 4, the compressor 31, and the I/C 30 from the upstream) of the intake system illustrated in FIG. 7 even in a control system for an engine including an electric charger, which is not limited to the mechanical supercharger.

Third Embodiment

The control system for an engine including a turbocharger is mentioned as an example in the first embodiment, and the control system for an engine including a mechanical supercharger is mentioned as an example in the second embodiment. Thus, a description has been given of the physical model of the intake system and the method of installing the physical model in the ECU.

However, the calculation method for the cylinder intake air amount based on the physical model of the intake system according to the present invention can be applied to a control system for an engine without a supercharger. The applicability to the T/C system, the S/C system, and the N/A system has an advantage in terms of the common use of the control programs in the ECU. Thus, in a third embodiment according to the present invention, a description is given of a method of applying the calculation method for the cylinder intake air amount based on the physical model of the intake system described before to the N/A system.

The characteristic of the physical model of the intake system according to the present invention is to consider the virtual intake manifold volume if it is assumed that the densities in all the areas are equal to the intake manifold density. It is not necessary to consider the virtual intake manifold volume Vb' in the N/A system, and hence an intake manifold volume Vb can be directly used.

Then, Equation (29) is acquired by replacing the virtual intake manifold volume Vb'(n) in Equation (16) by the intake manifold volume Vb.

$$W(n) = \frac{V_b}{K_v(n) \cdot V_c}, \tag{29}$$

$$K = \frac{V_b}{K_v(n) \cdot V_c + V_b},$$

$$1 - K = \frac{K_v(n) \cdot V_c}{K_v(n) \cdot V_c + V_b}$$

Moreover, Equation (30) is acquired by rewriting Equation (17) by using Equation (29). It should be noted that W(n) is eliminated. It should be noted that Equation (30) is the same as Equation (4) described in Paragraph 0063 of Japanese Patent No. 5328967.

$$\frac{Q_c(n) \cdot \Delta T(n)}{K_v(n)} = K \cdot \frac{Q_c(n-1) \cdot \Delta T(n-1)}{K_v(n-1)} + (1-K) \cdot \frac{Q_a(n) \cdot \Delta T(n)}{K_v(n)} \tag{30}$$

Then, Equation (31) is acquired by replacing the virtual intake manifold volume Vb'(n) in Equation (18), which is an equation for calculating the real time Kv, by the intake manifold volume Vb. It should be noted that Equation (31) is the same as Equation (6) described in Paragraph 0072 of Japanese Patent No. 5328967.

$$K_v(n) = \frac{Q_a(n) \cdot \Delta T(n) - \{\rho_b(n) - \rho_b(n-1)\} \cdot V_b}{\rho_b(n) \cdot V_c} \tag{31}$$

When the virtual intake manifold volume Vb'(n) of the physical model of the intake system according to the present invention is replaced by the intake manifold volume Vb in this way, the physical model becomes a publicly known physical model of the intake system in the N/A system. Thus, the physical model can be applied to the cylinder intake air amount in the N/A system only by replacing the virtual intake manifold volume Vb'(n) by the intake manifold volume Vb in the control block diagram illustrating the processing of calculating the cylinder intake air amount illustrated in FIG. 5.

As described above, according to the third embodiment, the physical model of the intake system can be installed in the ECU 100, and can be used in the engine control system. The output torque, the air-fuel ratio, the ignition timing, and the like can be highly precisely controlled by using the cylinder intake air amount Qc calculated in this way in the NA system.

As described above, the physical model of the intake system according to the present invention is applied to the control system for an engine including a turbocharger according to the first embodiment, to the control system for an engine including a mechanical supercharger according to the second embodiment, and to the control system for an N/A system according to the third embodiment. A description has been this given of the method of highly precisely calculating the cylinder intake air amount Qc and the like.

However, engine control systems to which the physical model of the intake system according to the present invention is applicable are not limited to these engine control systems, and the physical model of the intake system according to the present invention can be applied to a control system for an engine including a plurality of T/Cs connected in serial or in parallel, and a control system for an engine including both a T/C and an S/C based on similar ideas.

In other words, the physical model of the intake system can be applied to any of the systems by calculating densities in respective areas partitioned by the plurality of members such as the compressor, the I/C, and the throttle valve, and considering a virtual intake manifold volume if the densities of all the areas are equal to the intake manifold density based on the total air amount of the areas having different densities.

What is claimed is:

1. A cylinder intake air amount estimation apparatus for an internal combustion engine in which a path from an intake opening of an intake pipe of the internal combustion engine to a cylinder of the internal combustion engine is partitioned into a plurality of areas different in a density of air from one another, the cylinder intake air amount estimation apparatus being configured to calculate, based on an intake opening intake air amount taken into the internal combustion engine from the intake opening, a cylinder intake air amount entering the cylinder, the cylinder intake air amount estimation apparatus comprising:

an intake air amount detection part provided close to the intake opening so as to detect the intake opening intake air amount;

a per-area density calculation part for calculating the density of each of the plurality of areas;

an all-area average density calculation part for calculating, based on an intake pipe volume and the calculated density in each of the plurality of areas, a mass of the air existing in all of the plurality of areas and an average density of all of the plurality of areas;

a virtual intake manifold volume calculation part for calculating, based on the mass of the air existing in all of the plurality of areas and a total volume of the intake pipe, a virtual intake manifold volume by assuming that the density of the air in all of the plurality of areas is equal to a density in an intake manifold closest to the cylinder; and a cylinder intake air amount calculation part for calculating the cylinder intake air amount based on the intake opening intake air amount by using a physical model of an intake system derived based on a volume efficiency acquired by considering the intake manifold as a reference, which is a volume efficiency of the air entering the cylinder from the intake manifold, the virtual intake manifold volume, and a stroke volume per cylinder, the physical model being adapted to a control system for an engine including a supercharger.

2. A cylinder intake air amount estimation apparatus for an internal combustion engine according to claim 1, wherein the plurality of areas comprise a compressor, an intercooler, and a throttle valve in the stated sequence from an upstream of the intake pipe.

3. A cylinder intake air amount estimation apparatus for an internal combustion engine according to claim 1, wherein the plurality of areas comprise a throttle valve, a compressor, and an intercooler in the stated sequence from an upstream of the intake pipe.

4. A cylinder intake air amount estimation apparatus for an internal combustion engine according to claim 1, wherein the per-area density calculation part calculates the density for each of the plurality of areas based on a pressure and a temperature of each of the plurality of areas.

5. A cylinder intake air amount estimation apparatus for an internal combustion engine according to claim 1, wherein the volume efficiency acquired by considering the intake manifold as the reference is calculated based on the intake opening intake air amount, the density in the intake manifold, the virtual intake manifold volume, and the stroke volume per cylinder.

6. An estimation method, which is executed in a cylinder intake air amount estimation apparatus for an internal combustion engine in which a path from an intake opening of an intake pipe of the internal combustion engine to a cylinder of the internal combustion engine is partitioned into a plurality of areas different in a density of air from one another, the cylinder intake air amount estimation apparatus being configured to calculate, based on an intake opening intake air amount taken into the internal combustion engine from the intake opening, a cylinder intake air amount entering the cylinder, the estimation method comprising:

detecting the intake opening intake air amount;

calculating the density of each of the plurality of areas;

calculating, based on an intake pipe volume and the calculated density in each of the plurality of areas, amass of the air existing in all of the plurality of areas and an average density of all of the plurality of areas;

calculating, based on the mass of the air existing in all of the plurality of areas and a total volume of the intake pipe, a virtual intake manifold volume by assuming that the density of the air in all of the plurality of areas is equal to a density in an intake manifold closest to the cylinder;

deriving a physical model of an intake system based on a volume efficiency acquired by considering the intake manifold as a reference, which is a volume efficiency of the air entering the cylinder from the intake manifold, the virtual intake manifold volume, and a stroke volume per cylinder, the physical model being adapted to a control system for an engine including a supercharger; and calculating the cylinder intake air amount based on the intake opening intake air amount by using the physical model of the intake system.

\* \* \* \* \*